(12) United States Patent
Ghani

(10) Patent No.: US 11,881,027 B1
(45) Date of Patent: Jan. 23, 2024

(54) THREAT DETECTION OF A PERSON WITH A WEAPON USING POLYGON GEOMETRY IN A POOLING NETWORK

(71) Applicant: Rod Ghani, Paradise Valley, AZ (US)

(72) Inventor: Rod Ghani, Paradise Valley, AZ (US)

( * ) Notice: Subject to any disclaimer, the term of this patent is extended or adjusted under 35 U.S.C. 154(b) by 0 days.

(21) Appl. No.: 18/242,479

(22) Filed: Sep. 5, 2023

(51) Int. Cl.
| | |
|---|---|
| *G06V 20/52* | (2022.01) |
| *G06T 5/00* | (2006.01) |
| *G06V 10/25* | (2022.01) |
| *G08B 21/00* | (2006.01) |
| *G06T 7/12* | (2017.01) |

(52) U.S. Cl.
CPC .............. *G06V 20/52* (2022.01); *G06T 5/006* (2013.01); *G06T 7/12* (2017.01); *G06V 10/25* (2022.01); *G08B 21/00* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 8,437,556 B1 * | 5/2013 | Saisan | G06V 40/172 |
| 8,920,172 B1 | 12/2014 | Johannes et al. | |
| 9,886,833 B2 | 2/2018 | Noland et al. | |
| 10,733,865 B2 | 8/2020 | Lundy | |
| 10,816,658 B2 | 10/2020 | Frizzell | |
| 10,834,482 B2 | 11/2020 | Speicher et al. | |
| 11,276,213 B2 | 3/2022 | Cinnamon et al. | |
| 11,320,242 B2 | 5/2022 | Lyren | |
| 2016/0019427 A1 * | 1/2016 | Martin | G06V 40/10 |
| 2020/0225313 A1 | 7/2020 | Coles | |
| 2020/0364468 A1 * | 11/2020 | Sulzer | G06F 18/2148 |
| 2021/0006933 A1 | 1/2021 | Dean | |

* cited by examiner

*Primary Examiner* — Christopher G Findley
(74) *Attorney, Agent, or Firm* — Mark V. Loen

(57) ABSTRACT

The embodied invention is a threat detection system designed to provide active threat alerts based on live camera image analysis where a person has a weapon. Multi security cameras are continuously analyzed by an accurate and efficient neural network algorithm where camera images are simplified by using multi-node irregular polygons. Polygon geometry simplifies the identification of a body with a weapon located inside a rectangular box. The polygon nodes are positioned on the perimeter of the body and weapon. The irregular polygons fill the area between the body and the rectangular box. The live camera polygons are then compared to a stored library of polygons for firm identification and a calculation of the confidence level by comparing polygon area overlaps. When the confidence level is high enough, an alarm is raised.

21 Claims, 7 Drawing Sheets

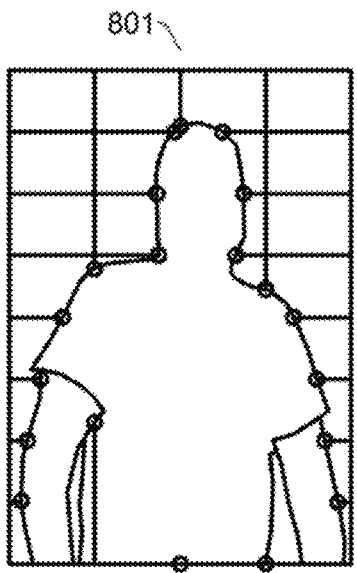
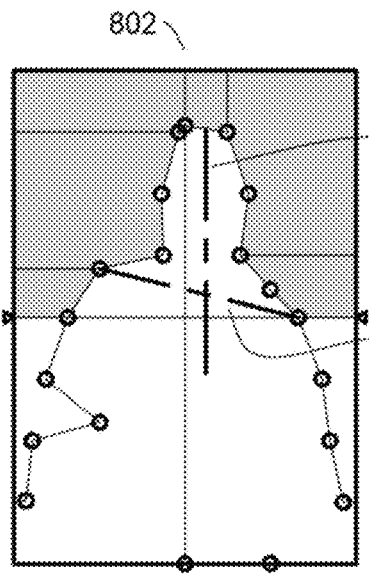
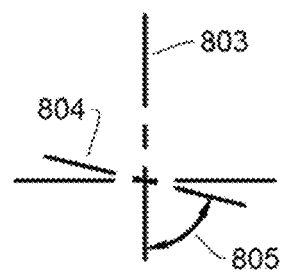
Fig. 8A    Fig. 8B    Fig. 8C
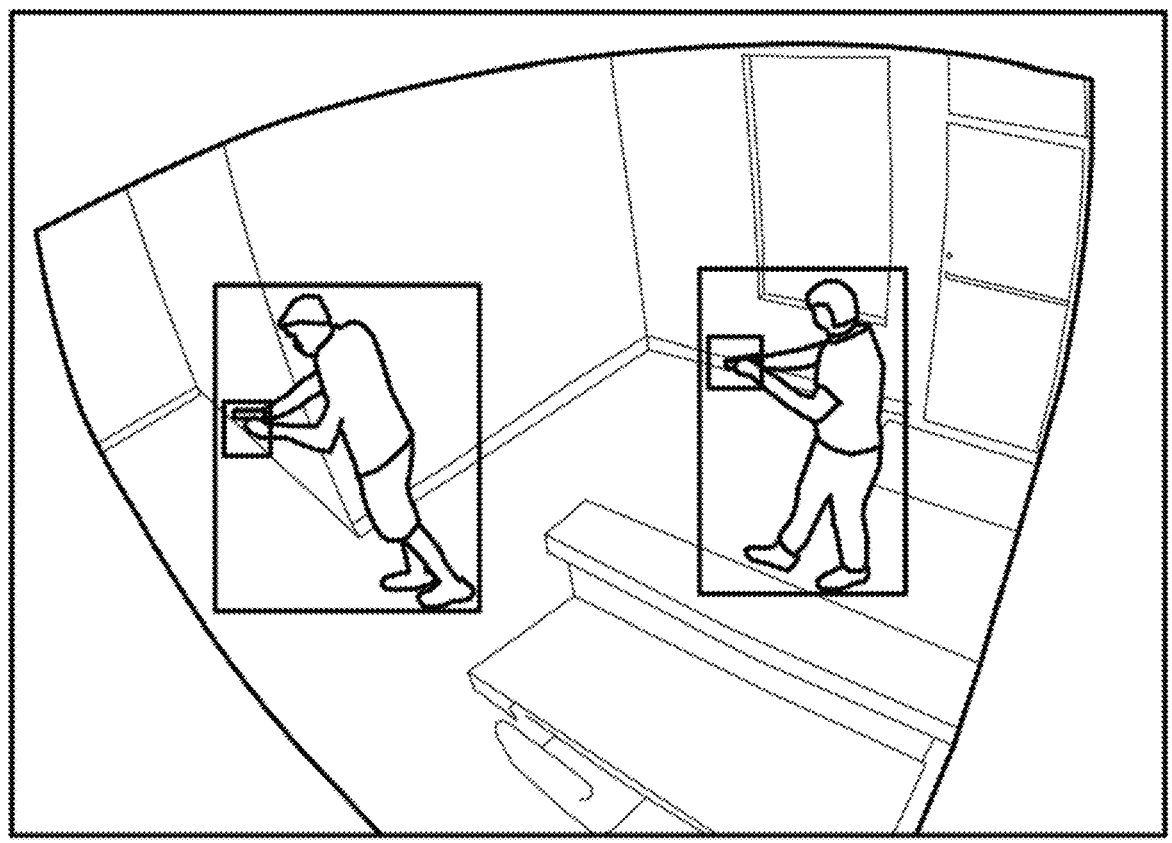
Fig. 9

THREAT DETECTION OF A PERSON WITH A WEAPON USING POLYGON GEOMETRY IN A POOLING NETWORK

RELATED APPLICATIONS

Not Applicable.

STATEMENT OF GOVERNMENT INTEREST

Not applicable.

BACKGROUND OF THE INVENTION

(1) Field of the Invention

This invention is directed to equipment and methods that facilitate examination of security camera images in real time to identify potential security threats involving a weapon.

(2) Description of Related Art

Examples of security systems include US publication 20210006933 where an individual is identified in a crowd and a security report is generated automatically based on recognition algorithms. U.S. Pat. No. 11,320,242 describes locating a person with a gun and aids a security person to move toward the identified person by using a virtual image. U.S. Pat. No. 11,276,213 describes a security screening station which identifies guns and rifles from an image to a confidence level, places a bounding box around them, and a human screening operator views the output of the result. U.S. Pat. No. 9,886,833 utilizes devices that monitor the sound of a gunshot, a pressure change, a gas sensor, computing a confidence score, and then communicating a threat to a security person or group. U.S. Pat. No. 9,786,158 discusses degree of confidence in a security system but does not discuss it in terms of a person or weapon identification.

Object, posture, and facial recognition programs detect edges by looking at higher pixel gradients in an image and apply various filters to improve results. Typically, after identifying edges, the lines and curves establish a basis for comparison to library images using similarly created lines from library pictures that identify objects. Object localization refers to identifying an object in an image and drawing a bounding box around it. Object detection classifies one or more objects in the box.

The current state of neural networking and learning systems is designed around high resolution images and an associated multiplicity of neural networks needed for artificial intelligence (AI) algorithms. Unfortunately, this requires significant computational capability to handle the images and provide a high confidence match.

Security systems demand accurate results to avoid false positives and false negatives to avoid the situation where a security system is judged to be unreliable and provides marginal security value.

It is also important that the system be affordable as well as reliable. There are many places such as schools, public buildings, and businesses where individuals have a statistically unlikely case of a serious security threat. Adding an expensive monitoring system is difficult to justify in such cases. Having a reliable, affordable, and automated security system is important for an occasional, but incredibly significant, security incident. Most preferably, threat identification occurs before an incident.

There is a need in the art to lower the computational effort for object or person recognition, reliably perform threat identification in real time, and identify an immediate security risk by a individual holding or carrying a weapon.

SUMMARY OF THE INVENTION

The embodied invention is a threat detection system designed to provide active threat alerts based on camera image analysis where a person has a weapon. Multi security cameras are continuously analyzed by an accurate and efficient artificial intelligence algorithm where camera images are simplified by using multi-node irregular polygons. Polygon geometry provides a less complicated way to identify a body. The polygon nodes are positioned on the perimeter of the torso, arms, legs, and head. Three to ten nodes per polygon are needed to identify a person associated with a weapon. The polygons are then compared to a library of polygons that indicate a weapon and a person associated with the weapon. The confidence level is calculated by comparing the polygon overlap areas to the best match library polygon area.

The polygons surround the areas outside of the weapon and human body. The 'negative space' analysis provides a streamlined identification of threatening posture and weapons. The primary function of the polygons is to provide a basis for calculating a confidence level by comparing an approximating polygon camera image against library images that are similarly reduced to a polygon image.

The polygon method of calculating a confidence level lowers the computational effort. To start, the camera image is changed to a lower resolution. The confidence level algorithm starts with low resolution to rapidly compare the camera image to low resolution library images. If no threat is identified, the next highest resolution is used, and the image is compared with higher resolution library images. This process continues until a threat is identified or the analysis cycles through a predetermined number of image resolutions, up to the original high resolution camera image.

An alert event happens when a person is associated with an identified weapon and the confidence level is high enough for an alarm.

An overall threat identification system includes security cameras, sound detection, infrared vision, a centralized computer system, an alert protocol, camera monitors, and a centralized computer system with local or remote monitors.

BRIEF DESCRIPTION OF THE FIGURES

FIGS. 8A-8C show how the posture of shoulders is analyzed to determine if there is an active shooter threat.

FIG. 9 is a security camera view which identifies two humans with a gun.

DETAILED DESCRIPTION OF THE INVENTION

The disclosed invention is an alert designed security system where security cameras feed images into an artificial intelligence (AI) system that identify threats from individuals and weapons within the camera viewing area. The AI system uses a neural network to identify multiple individuals and establish a rectangular bounding box around each one. This becomes a region of interest (ROI) for the AI system analysis.

Figure 1:
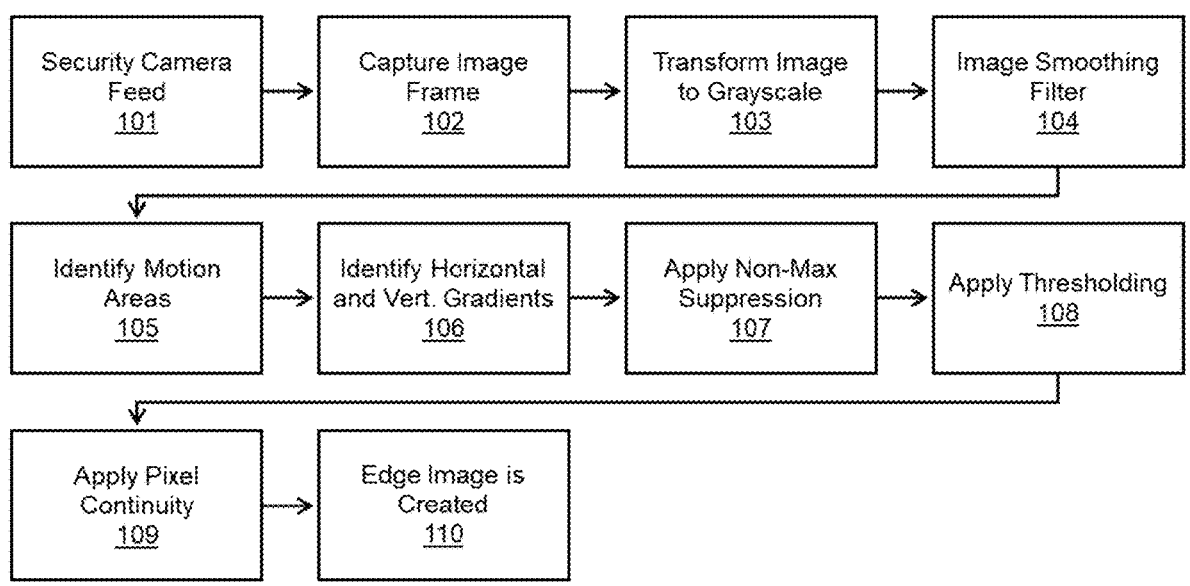
FIG. 1 shows the outline steps for identifying edges in a camera image.

In FIG. 1, a security camera 101 feeds input images 102 to an edge detector software engine that analyzes the sequential images. The engine then transforms the image into grayscale 103, by combining the red, green, and blue pixel colors according to an averaging equation. Next, the image is smoothed by a filter 104, such as a gaussian filter, to reduce noise. Next, the image is compared to a prior image to identify areas 105 where motion has occurred. These areas are then used for further analysis. Next, the stronger horizontal and vertical gradients are identified 106 as an edge. Next, a non-max suppression function 107 is applied to retain higher numeric pixels associated with an edge and set other pixels to zero. This is followed by a thresholding 108 filter to remove image noise and narrow the number of pixels that define an edge. A continuity filter 109 is applied to increase the value of a single pixel based on an examination of the surrounding eight pixels. Finally, the edges of the image are identified 110 by pixels that are non-zero.

Figure 2:
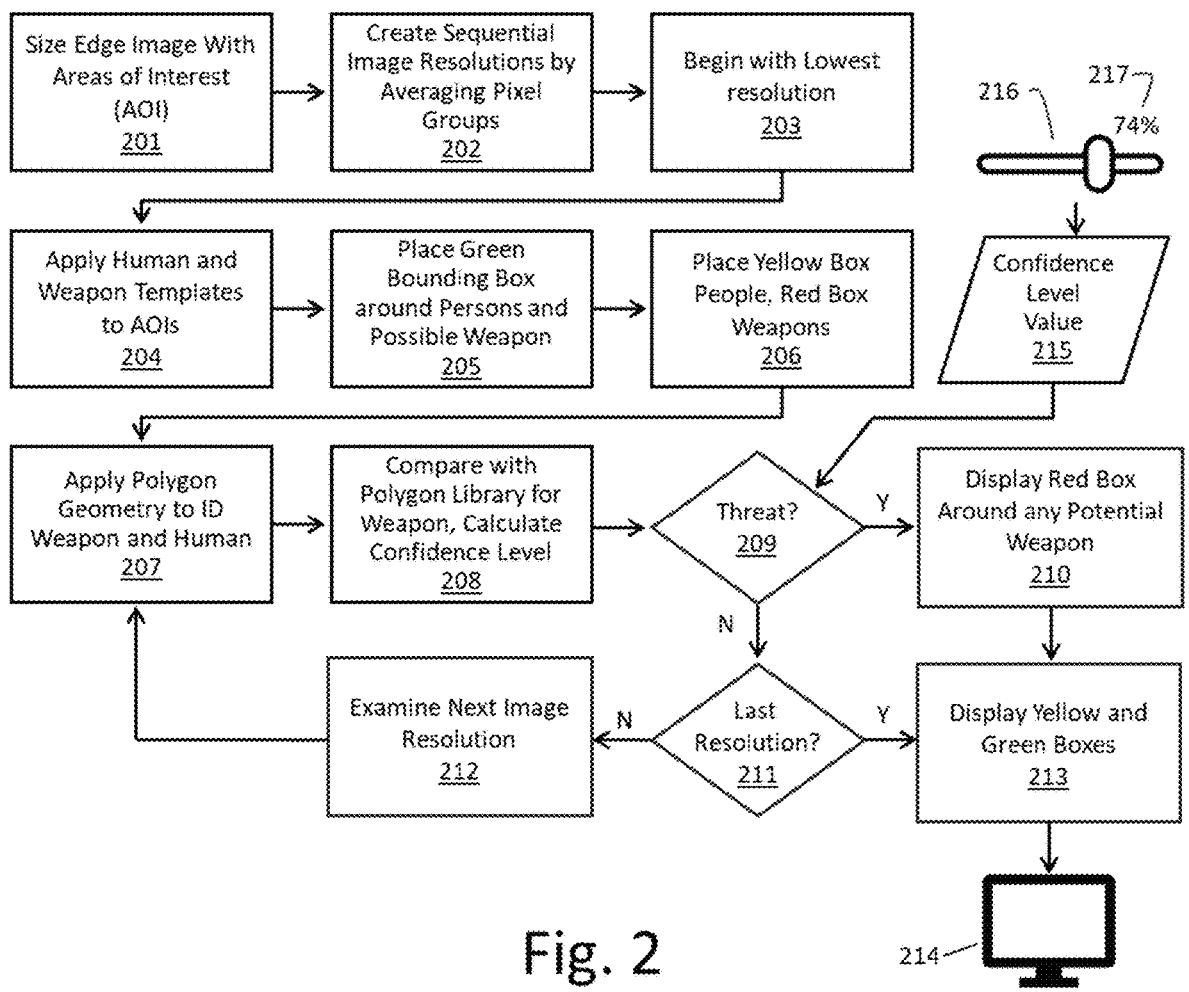
FIG. 2 Shows the steps needed to identify a person and a weapon that indicates a threat.

In FIG. 2, the goal is to identify regions of interest (ROI) and place a rectangular box around them. To do this, a Geometric Template Neural Network (GTNN) is applied to the areas that have motion and edges.

The high resolution edge image 201 with regions of interest (no motion) from FIG. 1 are further used by applying human and weapon templates to the ROI to identify threats from people and weapons.

The first step is to take the image and create sequential image resolutions by averaging groups of pixels (see FIGS. 3A, 3B), and create three more images. Typically, the resolutions are: the original camera resolution, ¼ resolution, and ¹⁄₁₆ resolution. These three resolutions are normally sufficient and preferred, but an optional fourth resolution of ¹⁄₆₄ may be added.

The GTNN method begins with the lowest resolution 203. Human and weapon templates 204 are applied to any regions of interest from areas with motion and are used to identify a person and a weapon. Scaling is used as needed. Next, where a human match is found, a green bounding box is placed around the identified person 205 with or without a weapon. Next, a yellow box is placed around people and a red box is placed around any weapon 206. The boxes are placed (positioned) on the image but are not displayed on a security monitor.

Next, the polygon geometry 207 to the human image and is compared to a polygon library of images to further identify a weapon and an associated person 208. The polygon geometry is used to quickly calculate a confidence level for both a weapon and a person. This will be further discussed in FIG. 4.

The polygon library includes of hundreds of thousands of camera images that have been reduced to polygon geometry at high, medium, and low resolutions. The ability to compare a polygon camera image to a library polygon image is an advancement in rapid security comparisons. Each image frame from a camera feed and a confidence level calculation can easily be performed at a speed of 60 frames per second. The computational and memory needs are moderate.

A GPU that is compatible with a CPU that uses multi-threads will provide a faster comparison between a single polygon image and a large polygon image library. It is a preferred computational method. Preferably the combination of CPU and GPU are affordable, and the hardware and programming can analyze each frame from a camera at a rate of at least 60 frames per second. In a preferred memory arrangement, the library images that are used for comparison and identification are stored in the GPU memory.

For 60 frames per second an exemplary GPU has 12 GB GDDR6X, a bus width of 192 bits, and a clock rate of 1.9 GHz.

Similarly, an acceptable 35 frames per second frame rate is obtainable by using a GPU with 8 GB GDDR5 Memory, a bus width of 256 bits, and a clock speed of 1.5 Gbps.

Next, a threat decision 209 is made by the confidence level calculation for a human associated to a weapon by proximity. To report this, a red rectangle is overlaid 210, 213 on the image displayed on a security monitor 214.

If no threat is seen by at least matching the confidence level input 215 to the threat decision 209, the next highest resolution is examined 211, 212 and the loop continues through the next two resolutions until a threat is seen, or the highest resolution is scanned. If the confidence level is low, more threats will be identified. If the highest resolution is scanned without a threat, the yellow (possible weapon) and green (person) rectangles are displayed on a security monitor 214.

This algorithm is less computationally demanding than a single pass by using high resolution camera image, as it is statistically likely that a threat will be seen in the lower two resolutions. Also, success in recognizing a threat is dependent on the number of grid lines that place the nodes.

A green colored bounding box is placed around a human and any possible weapon by using a library of images for humans and weapons. If a person and weapon are identified, a yellow box is placed around the human, and a read bounding box is placed around the weapon. At this point, the bounding boxes are placed in position, but not yet displayed on a security monitor. It is important that a confidence level is calculated before any threat is alarmed.

When a weapon and an associated with a person are simultaneously identified, and the confidence level is high enough, it is determined to be a threat 209, which causes the display on a security monitor 214 to show the red box around the weapon 210 and show the yellow box around the person 206, 213. Yellow and green boxes 206, 213 are continually displayed on the security monitor.

As an option, and to visually clarify a threat, the red rectangle around a weapon in a display includes the confidence level number, and the text 'Weapon'.

To simplify the confidence level input 215, a slider 216 is added to the security display of images that includes the numerical confidence level 217.

Figure 3A:
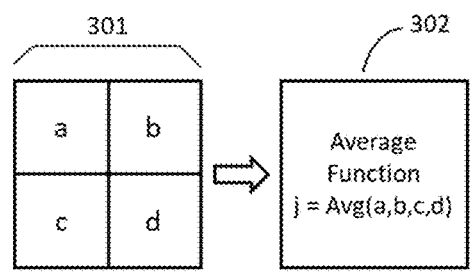
FIGS. 3A-3B show how pixels in a camera image are reduced to a lower resolution.
Figure 3B:
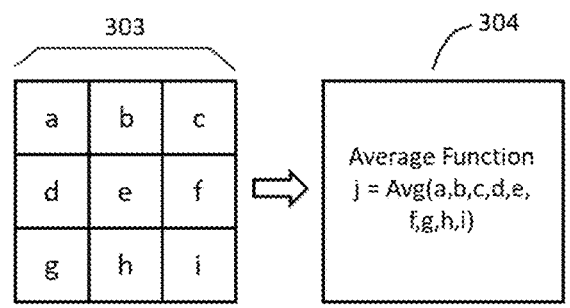

In FIG. 3A, a simple method is shown for lowering the resolution of the image as previously mentioned. Four pixels 301 have grayscale values a, b, c, and d. The resolution is changed 302 by averaging the values of the pixels to a single number j. Similarly, in FIG. 3B, nine pixels 303 are averaged to a single pixel 304 value of j by an averaging function.

Various averaging functions can be used, such as a simple average or a weighted average. Averaging functions like this are known in the art.

Figure 4:
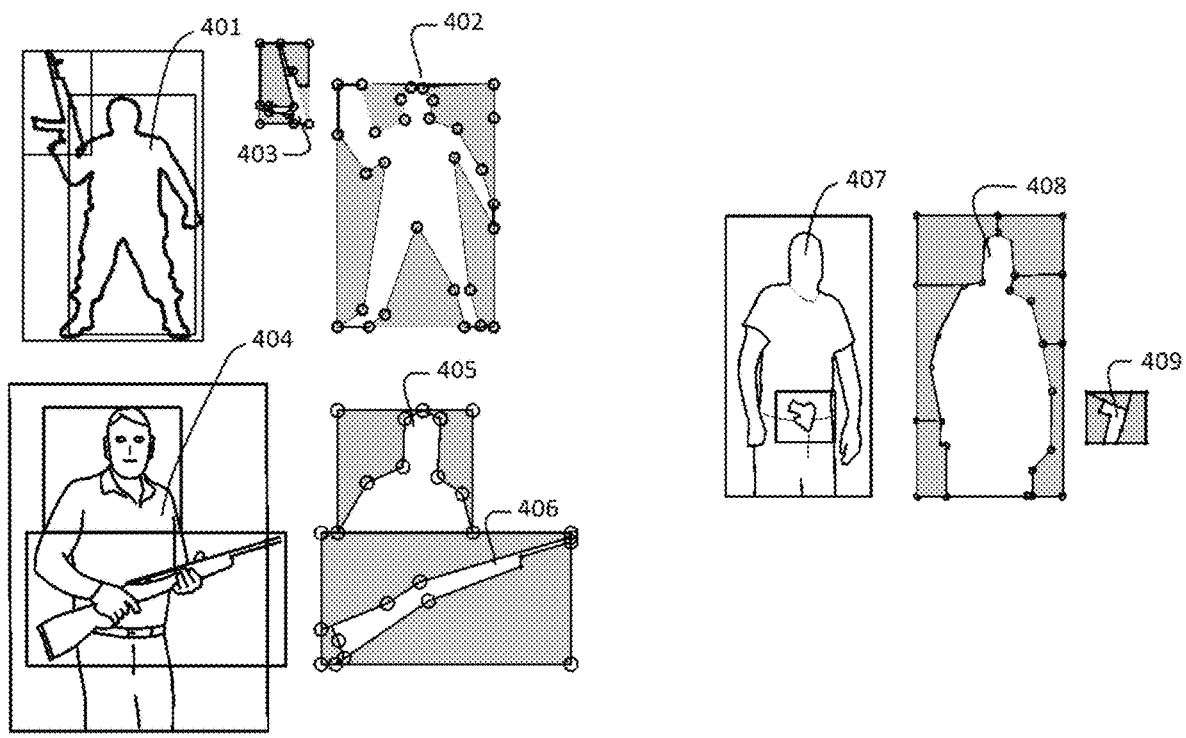
FIG. 4 shows how polygons are used to surround a weapon and a person within an identifying rectangle.

In FIG. 4, the node-polygon method of encompassing a person or a weapon is shown in three examples. The upper left FIG. 401 has a weapon, and the node fit for an irregular polygon fills the space from the anchor box around the weapon 403 and person 402. The lower left FIG. 404 has a weapon, and the body is partially blocked by the weapon. Similarly, the partial figure is identified by using surrounding polygons for the person 405, and the weapon 406. The right FIG. 407 is identified as a person 408 by surrounding polygons. The weapon 409 is identified by the surrounding polygons.

The polygons are filed in from the edges of the identifying rectangles already placed. All the polygons in the illustrations fill in the empty space to the identified edges 401, 404, 407.

Figure 5A:
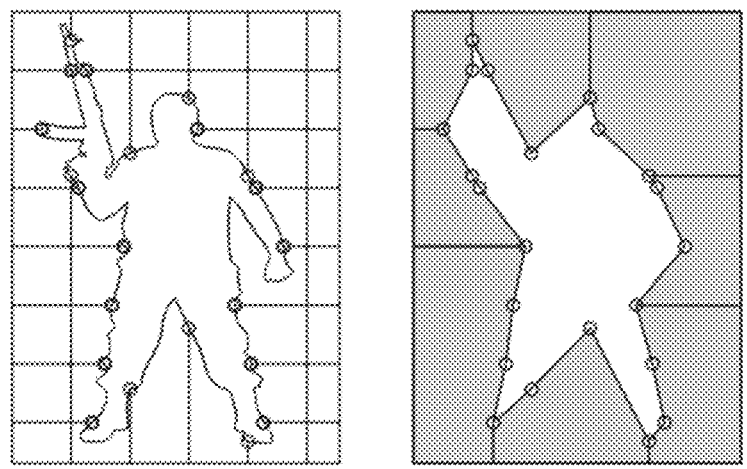
FIGS. 5A-5B shows how nodes are placed around a person's image by using horizontal and vertical lines that intersect an edge image.
Figure 5B:
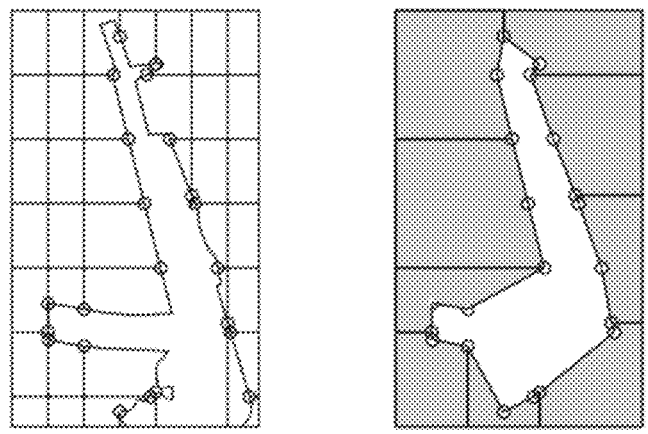

A more detailed understanding of node placement is shown in FIGS. 5A and 5B. A rectangular grid is placed under the edge image already created and extends to the perimeter identification box (green). Nodes are generated at the edge lines closest to the horizontal box sides, and closest to the vertical box sides. Nodes are not added when a grid line crosses an edge line within the outer perimeter of the edge image.

In FIG. 5A, a total of eight polygons define the outer perimeter of the body holding a weapon in the right hand. Note that the inside left arm and left abdomen edge lines do not receive a node, and the outside edge of the left arm receives three nodes.

In FIG. 5B, the weapon has nine polygons that define the outer space around the weapon.

In FIG. 5A seven horizontal grid lines and five vertical lines are illustrated. But in some cases, threat success is achieved with as few as three or four lines in each direction. The number of grid lines in each direction may vary from three to ten, which will create nine to one hundred nodes.

There is no restriction to the number of irregular polygons sides or how many polygons are used. Practical calculations work optimally well with about six nodes per polygon. However, a range of three to ten nodes for a polygon provides acceptable accuracy with reasonable computational effort.

Node placement can appear to miss important geometry, as the left arm in FIG. 5A has a space between the left arm and the body. A node will not be positioned in that space. However, the same difficulties of node placement occur when creating the polygon library images, so the downside to this issue is observed to be small.

Additionally, the node placement will change as the body moves through space, and the next camera image frame will again be compared to the polygon library, this time with slightly different node placements. Since many sequential camera images are compared to the library each second, a threat identified by a single camera image will disappear in the next image if a particular node placement creates a false positive.

Figure 6A:
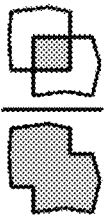
FIGS. 6A-6D show how confidence is calculated and how to calculate precision and recall.

In FIG. 6A, the IoU calculation is visually shown. An IoU is calculated by dividing the overlap between the live camera polygon area and library polygon area by the union of these two areas. The IoU calculation is the confidence level.

The comparison of a camera polygon image to a library polygon image is greatly simplified by calculating areas. All the polygons use a straight line between notes. This allows the IoU calculation to be straight forward and simplified.

Figure 6B:
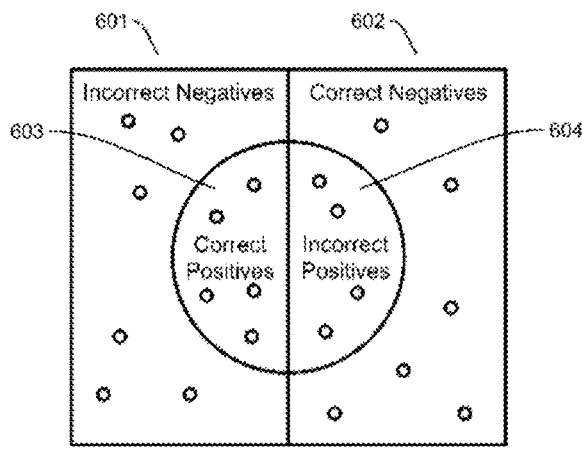

FIG. 6B visually shows the statistical error of the polygon based area comparison, and the use of the IoU calculation. Incorrect negatives 601 are compared to correct negatives 602. Unfortunately, and statistically, the correct positives 603 exist within the incorrect negatives. And incorrect positives 604 exist within the correct negatives.

Figure 6C:
Figure 6D:

In FIGS. 6C and 6D, precision is the correct positives divided by the sum of correct and incorrect positives. Recall is the correct positives divided by the sum of incorrect negatives and correct positives.

Overall, after creating a large library of polygon images, and then comparing separate camera images as though they are a live camera feed, showed that a confidence level of 75-85% is an optimal range. It was observed to be the sweet spot that balances the difficulties of FIG. 6B, having an optimum precision level for higher correct positives and smaller incorrect positives.

To that end, and with an understanding that a security person may want to adjust the confidence level that would be used to recognize a threat, the confidence level is an operator input 215 (FIG. 2). The allows an security person to assess a general situation and adjust the algorithm. In some situations, a false positive is a difficult security matter as security personnel may have to create unacceptable confrontations. Similarly, false negatives may not be acceptable in a high security area, and confrontations with security are well tolerated.

An example is a baseball stadium crowd that approaches a security arch checkpoint. An infrared camera security system that identifies potential problems on a person or in a handbag can flag the personnel to be more thorough. In this case, a lower confidence level is helpful with only a minor burden to the security handbag staff.

These situations are further mitigated by adding images to the polygon library based on acceptable and unacceptable security risks.

Figure 7:
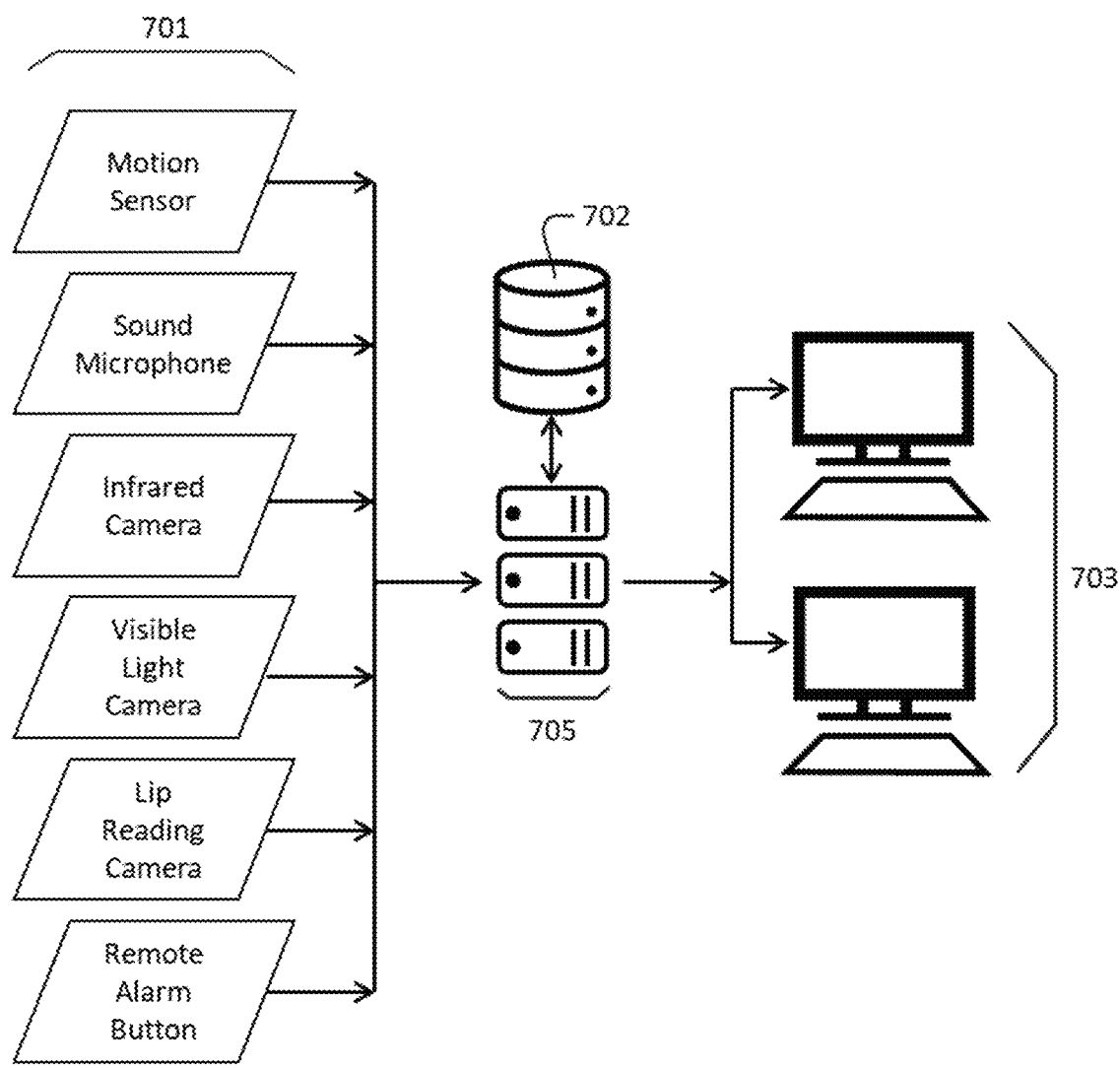
FIG. 7 shows the minimal equipment for a security system.

In FIG. 7, an essential outline for the equipment needed for a security system. Various sensors and cameras 701 include any of:
1. Motion sensors.
2. Microphones that will record sounds, such as a gunshot, yelling, group sounds from a panic situation, and others.
3. Infrared camera feeds.
4 Visible light camera feeds.
5. Lip reading cameras and an associated text recognition program.
6. Field alarm buttons.

The computer system includes a centralized processor group 705 with CPU, GPU, volatile memory, non-volatile memory, operating system, input-output cards, multi component connectivity, a security alert program, Admin functions, and Login functions. A data base 702 stores camera images, polygon libraries, image libraries, and other long term records. Various displays and monitors 703 and operator data entry keyboards are used to interface with security personnel. For speed, library images are preferably stored in volatile memory.

In FIGS. 8A-8C a method of identifying an active shooter is shown. In FIG. 8A, nodes are placed around an edge image of a human body 801. The body has been increased in magnitude so that the shoulders are in the upper two of a four quadrant box 802 as shown in FIG. 8B. The polygon nodes are similarly placed as already discussed in FIGS. 4-5B. The vertical line of the body 803 is identified by comparison to an active shooter template, and the shoulder angle line 804 is similarly identified by comparison to a library of active shooter polygons. The shoulder angle line 805 is then compared to the body line 803. If the angle 805 is 65-55 degrees, it is highly likely that the human form has a taken shooting posture. This reflects a person raising a weapon to see a target along the gun sight, or a posture preparing to sight a target.

In the event that this angle is measured, along with an identified weapon, an additional active shooter alarm is sounded, and an appropriate security protocol begins, based on the particular security area and building activity. Typically, an active shooter alarm is immediately broadcast to all security personnel, and typically includes notifying law enforcement.

A main goal of the embodied invention is to improve identification of weapons and ROI's by using better computational efficiency to allow real time monitoring. A reduced computational load improves the cost structure of AI monitoring. With lower computational needs, the identification system is suitable for a wide variety of institutions and crowd situations, including public places with little or no budget for security.

Overall, the computations are not burdensome to a multi thread GPU. Over 60 frames per second can be processed and successfully identify a weapon and a person holding a weapon.

At least 50 people in a single frame can be identified, surrounded by a rectangle, and analyzed according to the teachings of the embodied invention.

In a security installation, cameras are preferably installed in strategic locations inside and outside to detect individuals carrying weapons.

In FIG. 9, a security camera with a wide angle lens looks at the front lobby of an office. As you can see, the distorted camera view does not hinder the visual capture of two human forms with weapons. Since the two individuals are much smaller in width, their image is relatively undistorted.

The angle of the human forms will be the same for different areas in the camera image. This allows the template of a vertical human form to be rotated CCW on the left side of the wide angle view, and CW on the right side. The exact rotational amount depends on the position in the camera image. Since the distortion is well defined for a given camera, a rotating template algorithm is used to improve the template match to the edge image. The algorithm is simplified by utilizing five or ten degree rotational increments that cover wider areas. Cameras without this distortion do not need this correction algorithm.

The distortion correction algorithm takes the live image and . . .

The disclosed neural network AI algorithm is particularly trained to recognize weapons. Once the algorithm recognizes a weapon, and an associated person, security personnel are alerted. The security personnel then follow any protocols associated with their facility, and necessary steps can be taken. Additionally, threats are also discovered through sound recognition, image recognition, and motion recognition by using visual and infrared wavelengths. A centralized security program sends any alerts along with the image to designated security personnel for action. The alert can be on a monitor, or it can be sent to a remote security personnel device who has multiple duties throughout a facility.

As used herein the terms central computer and computer system are intended to refer to a computer-related entity, comprising either hardware, a combination of hardware and software, software, or software in execution capable of performing the embodiments described. The disclosed embodiments which use the central computer refer to being interfaced to and controlled by a computer readable storage medium having stored thereon a computer program. The computer readable storage medium may include a plurality of components such as one or more of electronic components, hardware components, and/or computer software components. These components may include one or more computer readable storage media that generally store instructions such as software, firmware and/or assembly language for performing one or more portions of one or more implementations or embodiments of an algorithm as discussed herein. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or solid-state or electronic memory. Other forms of non-transitory and/or tangible computer readable storage media not listed may be employed with the disclosed embodiments.

A number of such components can be combined or divided in an implementation of a computer system. Further, such components may include a set and/or series of computer instructions written in or implemented with any of a number of programming languages, as will be appreciated by those skilled in the art. Computer instructions are executed by at least one central processing unit. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. A system used to identify a weapon image associated with a human form in a security camera image comprising:
   A) at least one security camera provides a live image with a human form and a possible weapon to a security alert program,
   B) an edge image is obtained from said live image, said edge image contains a possible weapon edge image,
   C) said security alert program:
      a) places a bounding box around said possible weapon edge image,
      b) positions a plurality of polygons in the area between said possible weapon edge image and said bounding box,
      c) calculates a confidence level by comparing a total area of said plurality of polygons to a library of polygon weapon images representing a weapon, and
      d) activates an alarm if said confidence level is at or above a predetermined level.

2. The system according to claim 1, whereby sequential said live images are processed at least 60 times per second.

3. The system according to claim 1, wherein said edge image additionally comprises a human form edge image and said security alert program additionally:

A) places a second bounding box around said human form edge image,
B) places a second plurality of polygons in the area between said human form edge image and said second bounding box,
C) calculates a confidence level by comparing a total area of said second plurality of polygons to a second plurality of polygon human form library images, and
D) activates an alarm based on a confirmed weapon and confirmed said human form based on a predetermined confidence level.

4. The system according to claim 3, wherein a posture of said human form is identified by:
A) placing a third bounding box around an upper half of said human form,
B) positioning a third plurality of polygons in the area between said upper half and said third bounding box resulting in a third polygon image,
C) comparing said third polygon image to a library of active shooter polygon images to create a vertical posture line and a horizontal posture line, and
D) activating an active shooter alarm if horizontal posture line is at an angle of 75 to 65 degrees inclusive.

5. The system according to claim 1, wherein said library of polygon weapon images are created by:
A) placing a library bounding box around library weapon edge images, and
B) positioning a plurality of polygons in the area between said library weapon edge images and said bounding box.

6. The system according to claim 1, wherein a distortion program corrects any camera lens distortion in said edge image due to a wide angle camera lens.

7. The system according to claim 1, wherein said security alert program resides in a centralized processor group having a CPU, GPU, volatile memory, non-volatile memory, operating system, Admin functions, and Login functions.

8. The system according to claim 3, wherein said security camera incorporates a wide angle lens, said polygon human form library images are rotated according to a position in said camera edge image.

9. The system according to claim 8, wherein said volatile memory contains said library of polygon human forms and said library of polygon weapons.

10. The system according to claim 8, wherein a plurality of monitors with input devices are connected to said centralized processor group.

11. A system for identifying a security threat from a security camera image comprising:
A) a security alert program receives a live image from at least one security camera,
B) said security alert program obtains an edge image from said live image by using grayscale and an edge detection algorithm,
C) a plurality of human templates and a plurality of weapon templates are compared to said edge image to identify a human form and a weapon,
D) a box placement algorithm creates a human bounding box for any detected said human form and a weapon bonding box for any detected said weapon,
E) one to three lower resolutions of said edge image are created by a pixel averaging function that is sequentially applied to said live image resulting in two to four edge image resolutions,
F) said security alert program additionally:
a) begins with a lowest resolution of said live image and continuing through successively higher resolutions,
b) creates a plurality of first nodes on the perimeter of a detected said human form, and a plurality of second nodes on the perimeter of a detected said weapon,
c) connects said first nodes and an adjacent side of said human bounding box to create a plurality of polygons resulting in an polygon human image,
d) connects said second nodes and an adjacent side of said weapon bounding box to create a plurality of polygons resulting in a polygon weapon image,
d) compares polygon areas of said polygon human image to a human polygon image library and calculates a human confidence level,
e) compares polygon areas of said polygon weapon image to a weapon polygon image library and calculates a weapon confidence level,
f) activates an alarm if a combination of said weapon confidence level and said weapon confidence level is at a predetermined level.

12. The system according to claim 11, whereby sequential said live images are processed at least 60 times per second.

13. The system according to claim 11, wherein a posture of said human form is identified by:
A) placing a top bounding box around an upper half of said human form,
B) positioning a third plurality of polygons in the area between said upper half and said top bounding box resulting in a top polygon image,
C) comparing said top polygon image to a library of active shooter polygon images to create a vertical posture line and a horizontal posture line, and
D) activating an active shooter alarm if horizontal posture line is at an angle of 75 to 65 degrees inclusive.

14. The system according to claim 11, wherein said weapon polygon image library is created by:
A) placing a library bounding box around a plurality of library weapon edge images, and
B) positioning a plurality of library weapon polygons in the area between said library weapon edge images and said library bounding box.

15. The system according to claim 11, wherein a distortion program corrects any camera lens distortion in said edge image due to a wide angle camera lens.

16. The system according to claim 11, wherein said security camera incorporates a wide angle lens, said human polygon image library is rotated according to a position in said security camera image.

17. The system according to claim 11, wherein said security alert program resides in a centralized processor group having a CPU, GPU, volatile memory, non-volatile memory, operating system, Admin functions, and Login functions.

18. The system according to claim 17, wherein said volatile memory contains said human polygon image library and said weapon polygon image library.

19. The system according to claim 17, wherein a plurality of monitors with input devices are connected to said centralized processor group.

20. A system to identify a weapon image and calculating a confidence level using polygons comprising:
A) at least one security camera provides a live image with a weapon to a security program,
B) an edge image is obtained from said live image, said edge image contains a weapon edge image,
C) said security program:

a) places a bounding box around said weapon edge image,
b) positions a plurality of polygons in the area between said weapon edge image and said bounding box,
c) calculates a confidence level by comparing a total area of said plurality of polygons to a library of polygon weapon images.

21. A system to identify a human form image and calculating a confidence level using polygons comprising:
A) at least one security camera provides a live image with a human form to a security program,
B) an edge image is obtained from said live image, said edge image contains a human form edge image,
C) said security program:
  a) places a bounding box around said human form edge image,
  b) positions a plurality of polygons in the area between said human form edge image and said bounding box,
  c) calculates a confidence level by comparing a total area of said plurality of polygons to a library of polygon human form images.

* * * * *